10 # United States Patent Office 3,455,250
Patented July 15, 1969

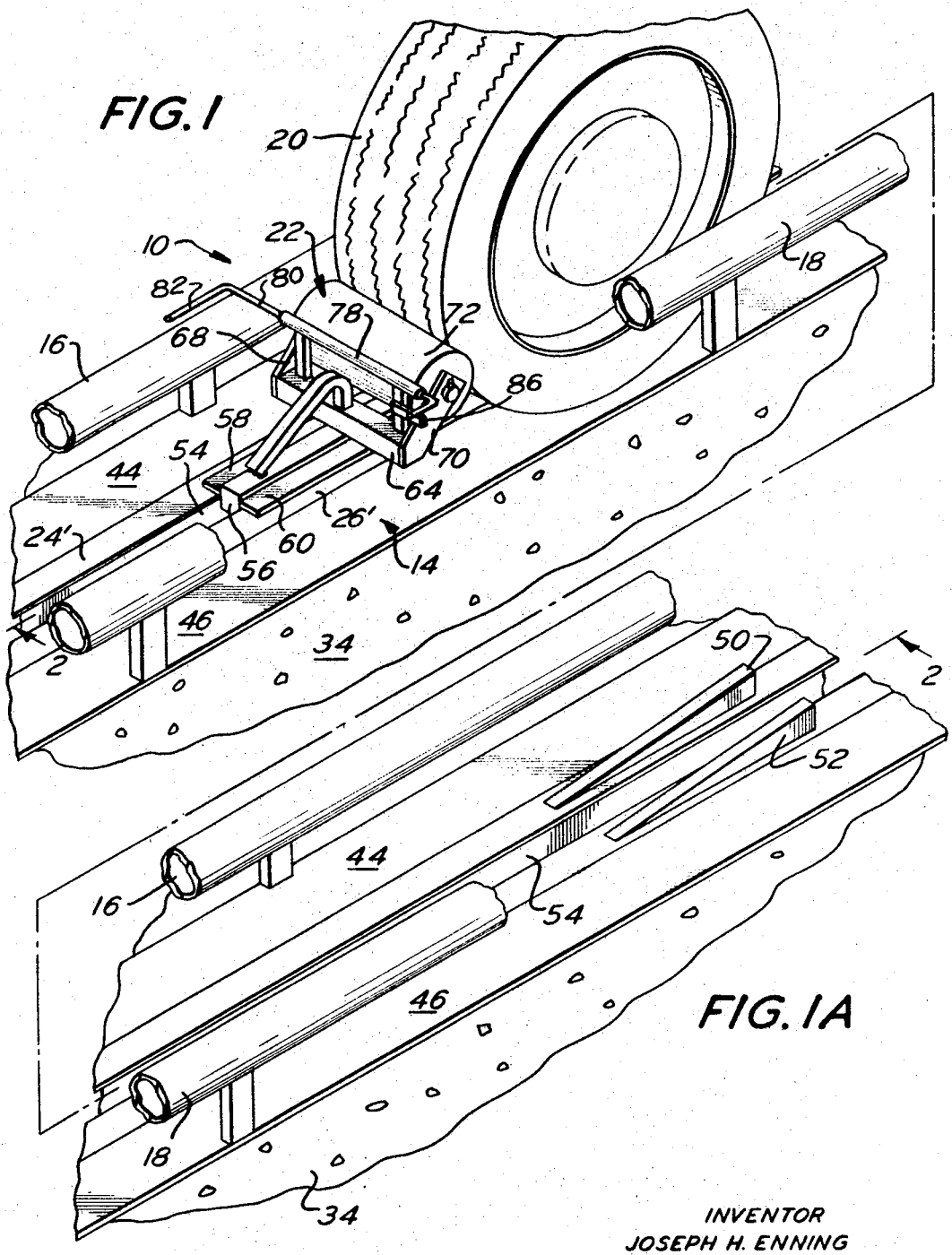

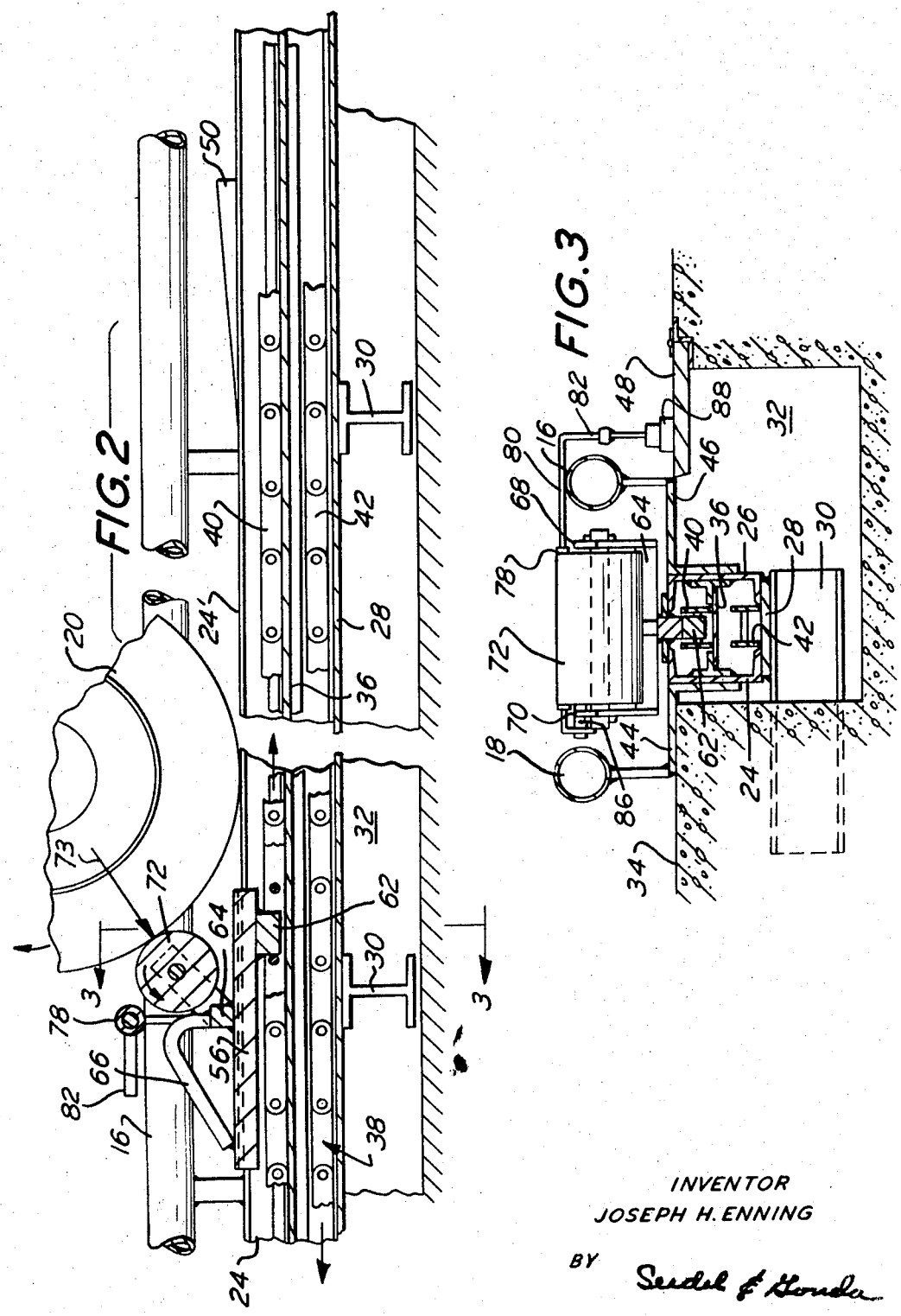

3,445,250
VEHICLE PUSHING APPARATUS
Joseph H. Enning, Neuss, Germany, assignor to Sherman Car Wash Equipment Company, Palmyra, N.J., a corporation of New Jersey
Filed Mar. 20, 1967, Ser. No. 624,464
Int. Cl. B65g 19/02
U.S. Cl. 104—172          4 Claims

ABSTRACT OF THE DISCLOSURE

A mechanical pushing apparatus is provided which is portable and separate from a conveyor means adapted to engage with the same to push the wheel of a vehicle through a predetermined guide path such as a vehicle washing apparatus.

---

The present invention is directed to a pushing apparatus which is structurally interrelated in a novel manner. The pushing apparatus is adapted to be removably coupled to an endless conveyor means such as an endless conveyor chain. A predetermined guide path is provided for the wheels of a vehicle such as a track. Beneath the track is provided the conveyor chain.

The track includes a main guide opening or slot through which a pin means on the pusher apparatus is adapted to extend. If desired, a portion of the body structure of the pusher apparatus may partially extend through the guide slot. The pin means is adapted to be removably coupled to a pushing surface on the endless conveyor chain for pushing the apparatus along the guide slot. The pusher apparatus includes a roller mounted for rotation about its longitudinal axis which extends transversely across the pusher apparatus. Said longitudinal axis is generally perpendicular to the guide slot. The pusher apparatus is adapted to engage the tire of a wheel and push the vehicle along the predetermined path.

Heretofore, it has been conventional in the car washing art to cause the vehicle to be pulled through the car washing equipment by means of a pull chain hook which normally is attached to the front end of the vehicle. It has also been conventional to push the vehicle by a member engaged with the rear bumper and forming an integral part of the conveyor chain. Still another system uses cantilever arms extending from a conveyor chain. Such cantilever arms are subjected to high forces tending to twist the chain. When the vehicle has passed through the car washing equipment, it is necessary for a worker to disengage the pull chain hook from the bumper or other portion of the front end of the car. The pushing apparatus of the present invention eliminates the necessity for that operation by a worker. In addition, pull chains and rear-bumper pushers sometimes cause damage to cars during routine operations and are frequently difficult to engage or disengage. The present invention eliminates this disadvantage of the prior art devices.

When using prior art devices such as a pull chain or rear-bumper pusher, a vehicle frequently hangs up in the conveyor for any one of a wide variety of reasons. When this occurs, the pull chains or the rear-bumper pushers have seriously damaged the cars, even though safety provisions, such as shear pins and the like have been provided. The pusher apparatus of the present invention eliminates this disadvantage to the prior art. In this regard, the pusher apparatus of the present invention engages the tire of the wheel at an elevation which permits the pusher to pass underneath the wheel if the vehicle should be obstructed or otherwise prevented from continuing its passage through the car washing equipment.

It is an object of the present invention to provide a novel pusher apparatus.

It is another object of the present invention to provide a novel pusher apparatus and associated conveyor means.

It is another object of the present invention to provide a novel pusher apparatus which overcomes disadvantages of the prior art including elimination of work handling by a worker, avoiding damage to vehicles if the vehicle should be obstructed, etc.

It is another object of the present invention to provide a vehicle pusher apparatus which will automatically disengage itself from the conveyor means when the vehicle has completed its passage through the car washing equipment.

It is another object of the present invention to provide a pusher apparatus which is simple, inexpensive, reliable, lightweight and easy to maintain.

It is another object of the present invention to provide a pusher apparatus for vehicles which can be used to actuate a switch for control of a part of the system such as the addition of wax to the wash liquid.

Other objects will appear hereinafter.

For the purpose of illustrating the invention there is shown in the drawings a form which is presently preferred; it being understood, however, that this invention is not limited to the precise arrangements and instrumentalities shown.

FIGURES 1 and 1A are partial perspective views of a conveyor means in accordance with the present invention having the pushing apparatus associated therewith.

FIGURE 2 is a transverse sectional view taken along the line 2—2 in FIGURES 1 and 1A.

FIGURE 3 is a transverse sectional view taken along the line 3—3 in FIGURE 2.

Referring now to the drawing in detail, wherein like numerals indicate like elements, there is shown in FIGURES 1 and 1A portions of a conveyor system designated generally as 10. The portion of the conveyor system shown in FIGURE 1A is an extension of the right-hand end of the portion shown in FIGURE 1 as indicated by the dot-dash line.

The conveyor system 10 includes a track designated generally as 14 defined by side guard rails 16 and 18. A wheel 20 of a vehicle rides on the track 14 between the guard rails 16 and 18. The rail 16 is lower than rail 18. Rail 16 is adjacent the inside surface of wheel 20 so as to be beneath the vehicle. Rail 16 is preferably not higher than about 4½ inches. Rail 18 may be 6 inches high or higher. Rails 16 and 18 maintain the wheel 20 on the track 14. The distance between the rails may be about 10 inches.

The wheel 20 is to be pushed along the track 14 by means of a pusher apparatus 22 as will be made clear hereinafter. The track 14, as shown more clearly in FIGURE 3, includes a pair of channel members 24 and 26 having top and bottom flanges extending toward one another. The top flange on channel member 24 is designated as 24'. The top flange on channel member 26 is designated as 26'. Channel members 24 and 26 are mounted on a base plate 28 and fixedly secured thereto in any convenient manner such as by welding. The base plate 28 is supported at spaced points therealong by transversely extending I-beams 30. The I-beams 30 extend between parallel pits spaced apart by a distance corresponding generally to the distance across vehicles to be pushed through the car washing equipment. One of the pits is designated as 32. The other pit not shown is parallel to pit 32. The pits facilitate maintenance.

The pit 32 is provided within a reference surface 34, such as a floor. As shown more clearly in FIGURE 3, the channel members 24 and 26 are interconnected by a wall 36 and brackets supporting the same. An endless conveyor chain 38 is provided within the track 14. Chain 38 has a top run which rides on the wall 36, and a bottom run which rides on the base plate 28.

The guard rail 18 is supported at spaced points therealong by upright posts having their lower ends fixed to an angle plate 44. The angle plate 44 has one leg fixedly secured to the channel member 24. The guard rail 16 is supported at spaced points by posts having their lower ends secured to a plate 46. Plate 46 has one leg fixedly secured to the channel member 26. The leg of the plate 44 supporting the guard rail 18 overlies the reference surface 34. The remainder of the pit 32 is closed at the top by a pivotably mounted or otherwise removable door 48.

The exit or terminal end of the track 14 is provided with sloping ramps 50 and 52 on opposite sides of the centrally disposed guide slot 54. As the vehicle moves along the track 14, the wheel 20 will ride up over the ramps 50 and 52 for a purpose to be made clear hereinafter.

The pusher apparatus 22 includes a body structure 56 which partially extends into the guide slot 54. Flanges 58 and 60 extend from opposite sides of the body structure 56. Flange 58 overlies the upper surface on flange 24' and is supported thereby. Flange 60 rides on the upper surface of flange 26' and is supported thereby. A pin means 62 depends from and is fixedly secured to the lowermost surface of the body structure 56 adjacent the front end thereof. The pin means 62 is adapted to extend into spaces in the chain 38 for contact with a pushing surface thereon such as transversely extending pins as shown more clearly in FIGURE 2.

A mounting block 64 extends transversely across the pusher apparatus 22 as shown more clearly in FIGURE 3. A handle 66, as shown more clearly in FIGURE 2, has one end connected to the body structure 56 and its other end connected to the mounting block 64. Handle 66 permits the pusher apparatus 22 to be picked up by a worker for manual positioning of the pusher apparatus 22 in the proper orientation so that it may be moved along the track 14 by means of the conveyor chain 38.

Arms 68 and 70 extend forwardly of the mounting block 64. Each arm has one end fixedly secured to the block 64. Hence, the arms 68 and 70 are supported in cantilever fashion. The free ends of the arms 68 and 70 rotatably support a roller 72 for rotation about an axis transversely of the track 14 and generally perpendicular to the length of the slot 54.

The arms 68 and 70 extend at an angle of approximately 45° with respect to the reference surface 34. The roller 72 preferably is a metal roller having a rough surface finish and a diameter of approximately 3½". The axis of rotation of the roller 72 is preferably spaced from the upper surface of the track 14 by a distance of approximately 2½". It will be noted that the pin means 62 is intermediate the front end of the body structure 56 and the axis of rotation of roller 72. If desired, the body structure 56 may be provided with a hook or hole to facilitate supporting the pusher apparatus 22 on a rack when not in use.

The forces applied on the roller 72 by the wheel 20 are directed in the general direction of arrow 73 in FIGURE 1 so as to be directed along arms 68 and 70. A switch actuation device may be provided on block 64. Such device includes vertical posts 74 and 76 which support a tube 78. A rod 80 is rotatably supported by tube 78 for rotation about an axis parallel to the axis of roller 72. Arms 82 and 84 extend parallel to each other from opposite ends of rod 80.

Arms 82 and 84 can be manually manipulated so to be moved from the inoperative horizontal position in FIGURE 1 to the operative vertical position in FIGURE 3. A limit stop 86 is fixed to post 76. Arm 82 facilitates movement of arm 84 since it is readily accessible whereas the arm 84 is underneath the vehicle and difficult to reach.

Arm 84 rests on top of limit stop 86 in FIGURE 1 and abuts a side face of limit stop 86 in FIGURE 3. As shown in FIGURE 3, rod 80 is long enough so that it extends over rail 16. When arm 82 is in the position shown in FIGURE 3, arm 82 will contact and close microswitch 88 which in turn can initiate introduction of wax into a wash liquid, actuate a buzzer, etc.

The operation is as follows:

A vehicle will be driven to position wherein its wheels are aligned between the guard rails 16 and 18 on one side of the vehicle. As is conventional, the vehicle's transmission will be placed in neutral. Thereafter, with the conveyor chain 38 being driven by a motor, not shown, a pusher apparatus 22 will be positioned as illustrated in the drawings so as to engage a wheel 20 on the vehicle. Wheel 20 may be either a front or rear wheel as desired. When the body structure 56 is partially disposed within the slot as shown in FIGURES 2 and 3, the pin means 62 will enter a space between pushing surfaces on the top run 40 of the conveyor chain 38. Thereafter, the chain 38 will push the apparatus 22 which in turn will push the vehicle along track 14 due to contact between roller 72 and wheel 20.

When a vehicle has been moved through the car washing equipment by the pusher apparatus 22, wheel 20 will ride over the ramps 50 and 52. When the apparatus 22 reaches the ramps 50 and 52, the flanges 58 and 60 will ride up the ramps, thereby causing the pin means 62 to disengage with respect to the chain 38. The wheel 20 will have cleared the ends of the ramps 50 and 52 before pin means 62 disengages from chain 38. Thereafter, the pusher apparatus will remain on the ramps and is easily removable by grasping the same at the handle 66.

The pusher apparatus 22 is preferably made from corrosion resistant materials since it will be exposed to washing liquids. That portion of the body structure 56 which enters the guide slot 54 is slightly smaller than the width of the slot and has side surfaces which are guided by the slot.

If it is desired to control a switch in an adjacent system such as a system for adding wax to the wash liquid, arm 84 is manipulated from the position in FIGURE 1 to the position in FIGURE 3. As the vehicle reaches the position along track 14 wherein the wax should be added to the wash liquid, arm 82 will trip microswitch 88. Other devices such as a light or buzzer to indicate that the vehicle has been washed may be actuated by arm 82.

If desired, flanges 58 and 60 may have rollers on their underside for rolling engagement with the upper surface of flanges 24' and 26'. Such rollers would decrease noise during relative movement and friction between these flanges.

It is claimed:

1. Conveyor apparatus comprising a track over which a vehicle wheel may roll, said track having a central, longitudinal guide opening, a conveyor chain below said guide opening, and removable pusher apparatus supported on said track above said chain, said pusher apparatus including a body structure having lateral guide surfaces on opposite sides thereof, pin means projecting downwardly from said body structure for abutment with a pushing surface on the conveyor chain, a cylindrical roller supported by said body structure for rotation about its longitudinal axis, said longitudinal axis being disposed generally perpendicular to said guide opening, said pin means being generally centrally located with respect to the length of said roller, said pin means having straight sides for releasable engagement with the pushing surface of said conveyor chain, said straight sides permitting vertical displacement of said pin means and said body structure relative to said conveyor chain when said pusher apparatus is being engaged with or removed from engagement with said conveyor chain, said roller being mounted above the track for contact with the vehicle to be pushed along the track, upstanding ramps at the discharge end of the track on opposite sides of the guide opening, and said guide surfaces being positioned so as to ride up the ramps when the pusher apparatus is conveyed to the ramps, said ramps having a height greater than the length of said pin means to cause the pin means to become disengaged with respect to the conveyor.

2. Apparatus in accordance with claim 1 wherein said guide surfaces are flanges projecting from opposite sides of said body structure.

3. Conveyor apparatus comprising a track over which a vehicle wheel may roll, said track having a longitudinal guide opening, a conveyor chain below said guide opening, removable pusher apparatus supported on said track above said chain, said pusher apparatus including a body structure having guide surfaces on opposite sides thereof, pin means projecting downwardly from said body structure for contact with a pushing surface on the conveyor chain, a roller supported by said body structure for rotation about its longitudinal axis, said roller being disposed generally perpendicular to said guide opening, said pin means being generally centrally located with respect to the length of said roller, said pin means being releasably engaged with the pushing surface of said conveyor, said roller being mounted above the track for contact with a wheel of a vehicle to be pushed along the track, guard rails on opposite sides of said track, said guard rails being supported by posts at space points therealong, and a switch actuation arm on said body structure, said arm being movable between an operative actuation position and an inoperative actuation position, and means extending over one of said rails for supporting said switch actuation arm.

4. Conveyor apparatus comprising a track over which a vehicle wheel may roll, said track having a central longitudinal guide opening, at least one flight of an endless conveyor chain parallel with and below said guide opening, and a self-releasable pusher apparatus supported on said track above said chain, said pusher apparatus including a body structure having lateral guide surfaces on opposite sides thereof for cooperating with said track, pin means projecting downwardly from said body structure for abutment only with a pushing surface on the conveyor chain, a cylindrical roller supported by said body structure for rotation about its longitudinal axis, said longitudinal axis being disposed generally perpendicular to the guide opening, said pin means being generally centrally located with respect to the length of said roller, said pin means having sides shaped for self-releasable engagement with the pushing surface of said conveyor, and said roller being mounted above the track for engagement with the tire of a vehicle to be conveyed along the track.

References Cited
UNITED STATES PATENTS

| | | | |
|---|---|---|---|
| 1,720,785 | 7/1929 | Edler | 104—172 |
| 2,816,516 | 12/1957 | Diehl | 104—88 |
| 3,022,746 | 2/1962 | Wells | 104—172 |
| 3,058,433 | 10/1962 | Hurst | 104—172 |
| 3,064,587 | 11/1962 | O'Neal | 104—172 |
| 3,196,806 | 7/1965 | Brunder | 104—172 |
| 3,233,557 | 2/1966 | Rickel | 104—172 |
| 3,260,219 | 7/1966 | Vani | 104—172 |
| 3,334,595 | 8/1967 | Natof | 104—172 |

ARTHUR L. LAPOINT, Primary Examiner

DANIEL F. WORTH, III, Assistant Examiner